INVENTOR
Robert KLEIN jr.
By his AGT.

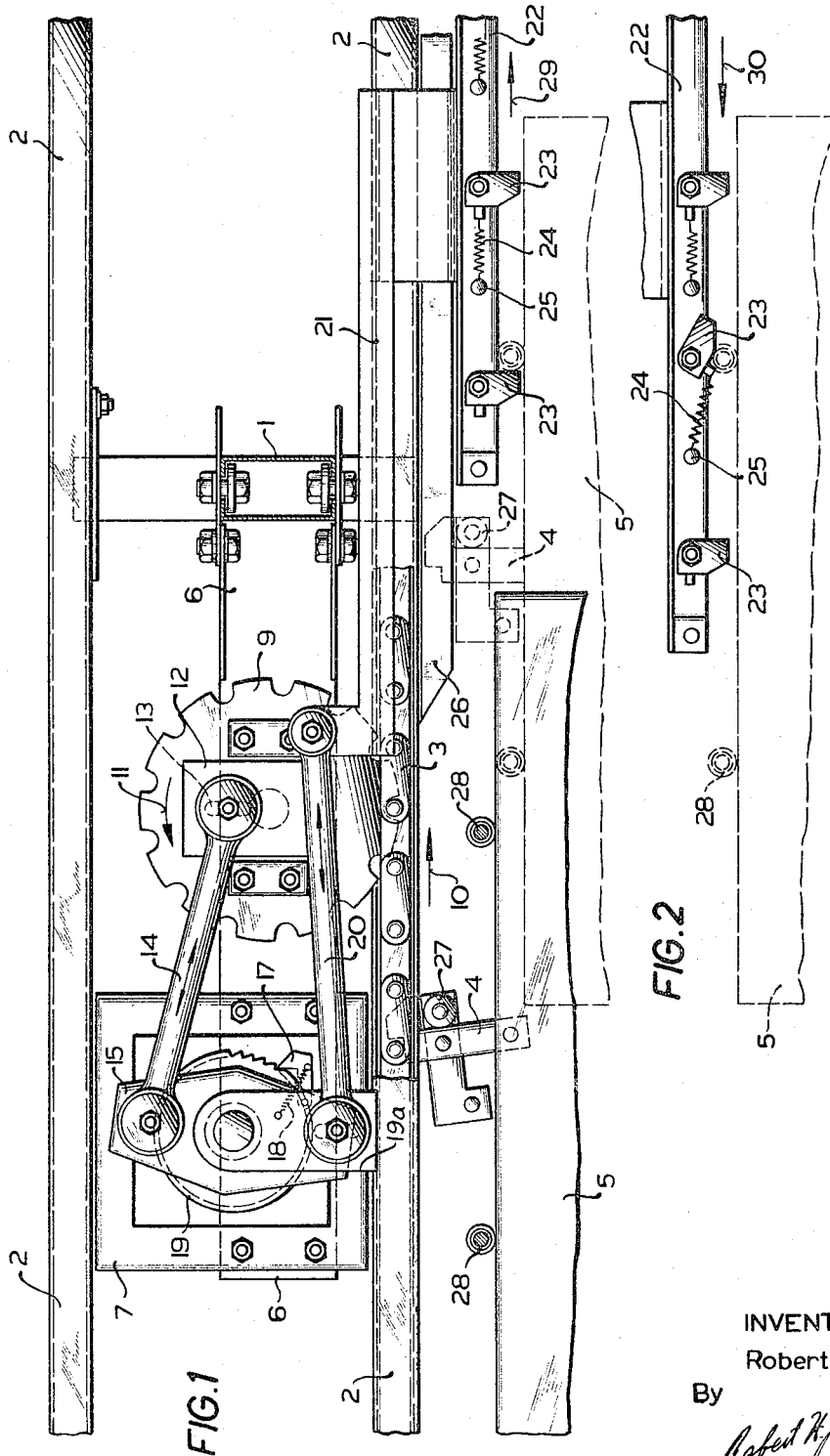

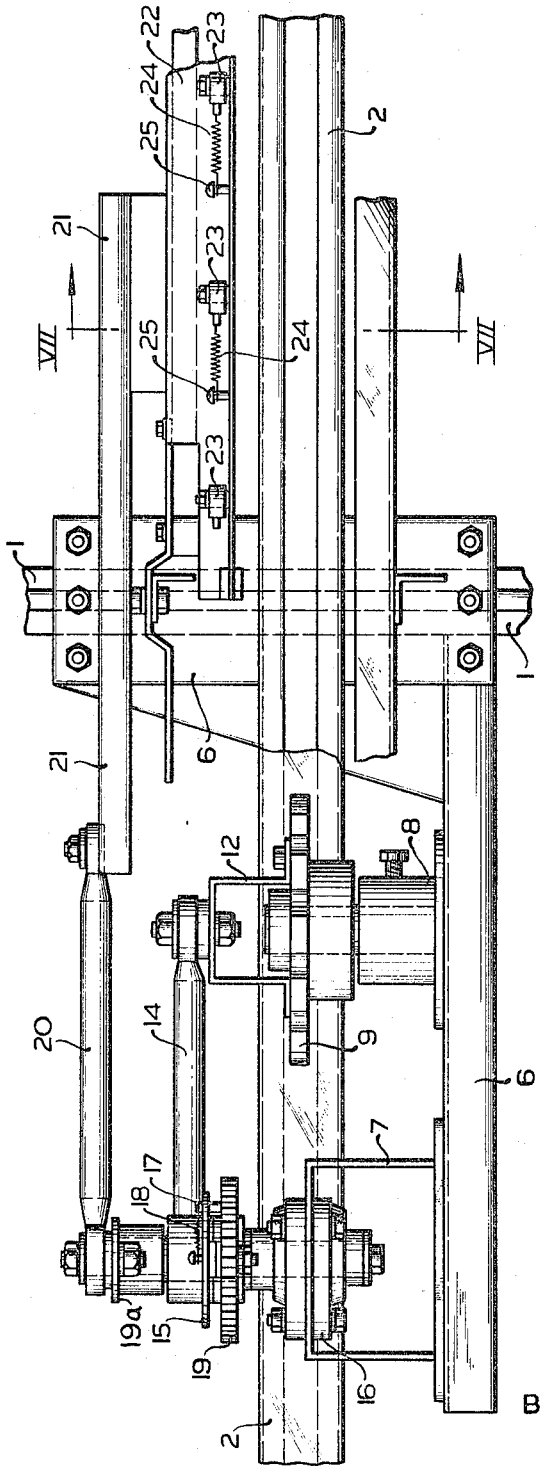

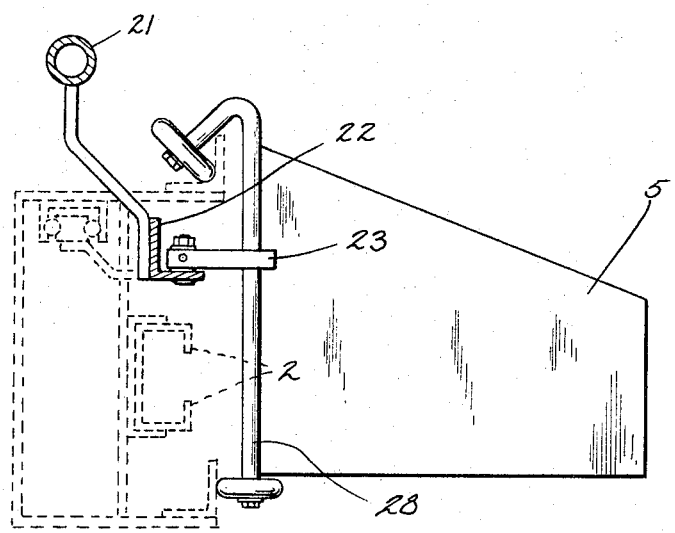

United States Patent Office 3,382,968
Patented May 14, 1968

3,382,968
ARRANGEMENT IN CONVEYOR SYSTEMS FOR DECREASING THE ADVANCING SPEED OF CARRYING CASES
Robert Klein, Jr., Landauer Strasse 56,
Pirmasens, Pfalz, Germany
Filed Oct. 12, 1966, Ser. No. 586,156
Claims priority, application Germany, Oct. 12, 1965,
P 37,851; June 22, 1966, K 59,561
5 Claims. (Cl. 198—110)

ABSTRACT OF THE DISCLOSURE

An arrangement in a conveyor system for decreasing the advancing speed of carrying cases or the like which are connected for normal transportation to a conveyor chain and transferred for advancing at a retarded speed to a feed rail which derives slow motion from the conveyor by way of a mechanism which includes a chain wheel in engagement with the conveyor and devices including push rods which convert the rotary motion of the chain wheel to reciprocating movement of the feed rail.

BACKGROUND OF THE INVENTION

The invention relates to conveyor systems of the type employing carrying or transfer cases for transporting objects between operating or working stations. More in particular, the invention concerns an arrangement for decreasing the advancing or feeding speed in conveyor systems, for example, chain conveyors for carrying cases or carriages or plates. In the production of personal use or consumer articles such as shoes, all kinds of textiles, etc., increasing use is made of means for simplifying the production steps. A prerequisite for this is the availability of a conveyor installation by means of which the products to be manufactured or their component parts or the semi-manufactured goods serving as the starting materials are transported from one operating station to the next station and are subjected in or on these transportation installations to different operating steps or treatments. As an example the manufacture of shoes is mentioned, where the individual components or parts necessary for manufacturing a shoe are channelled to the different treatment operations by means of a transportation installation.

Frequently it is necessary to subject the articles during an intermediate stage in the manufacturing operation for a considerable time period to the influence or effect of a treatment agent. Thus, for example, component parts of shoes must pass through a drying tunnel after certain treatment operations. If this passing, for example, through a drying tunnel, takes place at the normal rate of advancing speed of the conveyor installation, there frequently result considerable tunnel lengths, which depend on the necessary treatment time and, therefore, necessarily lengthening of the conveyor system and increases in the size of the entire installation, which can lead to considerably increased space requirements.

THE INVENTION

Accordingly it is an object of the invention to solve the problem of providing ways and means for reducing the speed of progression of carrier cases and boxes or the like in these treatment zones, such as drying tunnels of the conveyor installations, in order to obtain a corresponding decrease of the longitudinal extent of these parts of the installation. For example, if one achieves the reduction of the advancing speed in a drying tunnel to one-half of the normally required advancing speed, then the length of the tunnel is also shortened to one-half of the previously required dimensions. Considering that, for example, in the production of shoes, a plurality of such drying tunnels and similar treatment zones are required in the production operation, it becomes obvious that the solution of the problem to be solved brings about a very substantial reduction of the space requirement for the conveyor system and thereby for the entire plant.

In accordance with the invention the problem is solved by an arrangement or device in conveyor systems for transfer carriages or boxes for reducing the forwarding speed thereof, where besides advancing means of the conveyor installation, for example a belt or chain, additional or slow advancing means are provided in one or more stretches of the conveyor installation that are guided or controlled by available advancing means, for example by the belt or chain, and which impart to the transfer carriages, boxes or the like a stepwise or pacing, retarded advancement.

Thus the continuous feed or progression is interrupted at equal intervals while the feeding or advancing is slowed down or retarded.

It is a further object of the invention to provide between the continuously operating advancing means and the slow advancing means for conversion to a stepwise forward movement, reduction devices for the further deceleration of the feed.

These reduction devices may be continuously adjustable or variable, i.e., not in steps. The advancing means for the stepwise feeding preferably comprise a thrust or connecting rod controlled by the continuously operating advancing device, for example, a belt or chain which acts on a ratchet wheel, and a further thrust or pusher bar which in turn is controlled by this ratchet wheel and acts on a thrust bar arrangement where the thrust bar arrangement is provided with pawls or ratchets for engagement with corresponding coupling means of the transfer carriages or boxes, and a lifting rail for releasing these couplings from the advancing means of the conveyor installation.

The thrust bars or rods which convert the continuous feed to a step-like advancing may be slidably supported at least at one end in elongated slots and adapted to be rigidly secured in position. In lieu of the ratchet wheel, which in addition to the actual gear or a disk with teeth around its circumference has a catch which under the resetting force of a spring cooperates with this circumference, it is also possible to provide a roller coupling in combination with a stopping device. Also here, the thrust bar effects a reciprocating movement. This is converted by the roller coupling into a step-like or pacing rotary movement, which in turn is converted into a reciprocating movement of the thrust bar connected in series therewith. The stopping device in this connection prevents any possible return movement of the roller coupling that can develop as the rolls of the roller coupling are uncoupled.

In practice it frequently happens that stowing or blocking of the carriages or boxes occurs in a conveyor arrangement. If this happens after or following the arrangement in accordance with the invention for reducing the speed of the feed, it results that the carriages or boxes under the effect of the following carriages or boxes are again coupled onto the continuously rotating advancing means of the conveyor installation, for example a belt or chain. In order to avoid this the invention furthermore provides for connecting a friction coupling in series with the roller coupling that is so adjusted that it cannot overcome the resistance of the accumulated or stowed carriages or boxes, so that these carriages can not be unintentionally subjected at too early a moment to the effect of the continuously rotating advancing means of the conveyor installation.

BRIEF DESCRIPTION OF THE DRAWINGS

Further objects and advantages of the invention will become apparent from the following description with reference to the embodiments of the arrangement in accordance with the invention illustrated in the drawings, in which:

FIG. 1 is a top view of the installation,

FIG. 2 shows a part of this top view in a different phase of operation,

FIG. 3 is a side view of the installation illustrated in FIG. 1,

FIG. 7 is a sectional view showing the general arrangement of the frame and bars and the means for mounting the carriages or boxes taken along a line VII—VII in FIG. 3 with the supporting frame shown in dashed lines.

DESCRIPTION OF THE INVENTION

Figure 4:
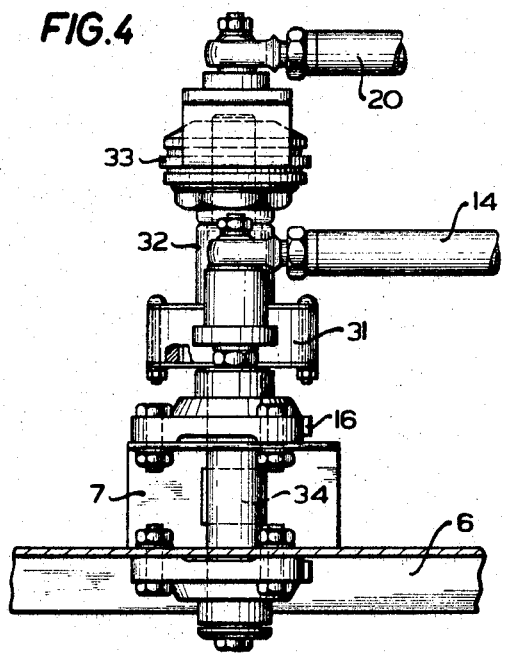
FIG. 4 is a partial sectional view of the arrangement in a different form of execution, taken from the side.

The conveyor arrangement has a carrying support 1 provided with chain guiding rails 2 for the continuously advancing feeding means, which in the embodiment illustrated is in the form of a continuously moving roller chain 3 the height of which is adjustable on the carrying support. The couplings 4 of the transfer carriages or boxes 5 are in engagement with this roller chain 3 along the transfer or transport sections. This imparts to the transfer carriages or boxes a certain continuous advancing speed. If this advancing speed is to be decreased, for example through the zone of a drying tunnel, the arrangement in accordance with the invention may be used for this purpose.

A bracket 6, the height of which may be adjustable, is mounted on the carrying support 1, carries in turn a mounting frame 7 and a shaft sleeve 8.

The shaft sleeve 8 serves for journalling a chain wheel 9 which is in engagement with the roller chain 3, so that in accordance with the continuous feeding velocity of the roller chain 3 in the direction of arrow 10, it rotates continuously in the direction of arrow 11. An eccentric support 12 having a slot 13 is mounted on the belt or chain wheel 9. A pusher bar 14 has one of its ends connected in this slot 13 by means of a securing device, for example a screw, and at its other end this pusher bar 14 is in engagement with a ratchet plate 15 which is mounted by means of a flange bearing 16 in the frame 7 and is in engagement with a ratchet wheel 19. The ratchet wheel 19 cooperates with a pawl 17 which is biased into engagement with ratchet wheel 19 by means of a spring 18.

A further pusher bar 20 leads from the ratchet plate 15 to a feed bar connection 21 which is in communication with a feed rail 22 provided with pawls or catches 23. These catches 23 are pivotable and are biased by means of return biasing springs 24 which are secured at their other ends on spring support pins 25.

Furthermore a transfer carriage lever lifting or disengaging rail 26 is provided, and a lifting lever and shaft 27 is arranged on the transfer carriage 5 which cooperates with the lever lifting or disengaging rail 26.

Carriage axles 28 serve at the same time as catches or pawls in their cooperation with the feed rail 22. It is, of course, also possible to provide special catches on the transfer carriages.

In a modified embodiment of the arrangement in accordance with the invention a mounting support 7 is provided on the carrier or block 6 which, in turn, carries a flange bearing 16. This flange bearing 16 serves for securing and journalling a roller coupling 31 which takes the place of the ratchet wheel in accordance with the first embodiment described above. Such a roller coupling is less sensitive in operation than the relatively easily soiled and heavily loaded ratchet wheel.

The manner of operation of the arrangement is as follows: The arrangement in accordance with the invention is provided at the start of a section or stage of the conveyor installation where the transfer carriages or boxes are to be subjected to slower forward movement than in the other sections of the conveyor installation. The feed rail 22 with the pawls or catches 23 extends over the entire length of this section.

The reduction of the feeding speed is effected by way of the chain wheel 9 which has mounted thereon as an eccentric foot a U-shaped bracket 12 having a slot 13. By means of the feed bar 14 the rotary movement of the chain wheel 9 is converted into a reciprocating movement. This reciprocating movement is again converted by way of the ratchet plate 15 to rotary movement of the ratchet wheel 19, whose rotational movement takes place only after a forward thrust of the ratchet plate 15. This causes a retardation of the forward feed movement by sub-dividing it into individual successive steps. The rotary movement of the ratchet wheel 9 is then finally converted to reciprocating movement for the actual feeding element of the installation, i.e., advancing rails 21, 22 by means of the pusher bar 20 which is connected with the ratchet wheel 19 by means of a lever 19a. The aforementioned lever 19a of the ratchet wheel 19 is also provided with a longitudinal slot for securing the pusher bar 20, which is like the slot 13 in the eccentric foot 12 of the chain wheel 9. By varying the location of securement of the pusher bars 14 and 20 in the longitudinal slots, the advancing speed can be furthermore controlled continually without steps to zero.

The feed carriages 5 or the like are uncoupled from the chain 3 of the conveyor installation by way of the lever lifting bar 26 by means of the carriage coupling and lifting lever and shaft 27.

In FIG. 1 the transfer carriage 5 is illustrated at the left in engagement with the roller chain 3 of the conveyor installation. At the right, it is indicated in this figure in dashed lines in engagement with the forwarding rail 22. Here the forwarding rail 22 is just effecting a forward movement in the direction of the arrow 29. In FIG. 2 again, the transfer carriage 5 is indicated in dashed lines, and the feed rail 22 is just effecting a return step in the direction of the arrow 30.

Feed bar 21 effects a reciprocating movement in a direction parallel to the advancing direction of the carriages 5. This reciprocating movement is imparted to bar 21 from the ratchet plate 15 by way of pusher bar 20. Feed rail 22 has the reciprocating movement imparted to it by feed bar or rail 21. In the embodiment illustrated the stepwise movement is imparted to the carriages or boxes by the pawls or catches 23 on the feed rail 22 which engage the carriage axles 28.

A prerequisite for this stepwise movement of the carriages is that the connection with the continuously moving conveyor means, such as the roller chain 3, is interrupted. This is accomplished by couplings 4 which are acted on by the pivotally supported lifting shaft 27. As this shaft 27 engages the inclined forward end of the lifting bar 26 it is moved downwardly into horizontal position, coupling 4 is disengaged from chain 3 and assumes the vertical position indicated on the right side in FIG. 1.

It should be noted that feed bar 21 and rail 22 are rigidly connected with one another and move together, while lifting bar 26 is mounted on the supporting frame and is stationary.

Figure 5:
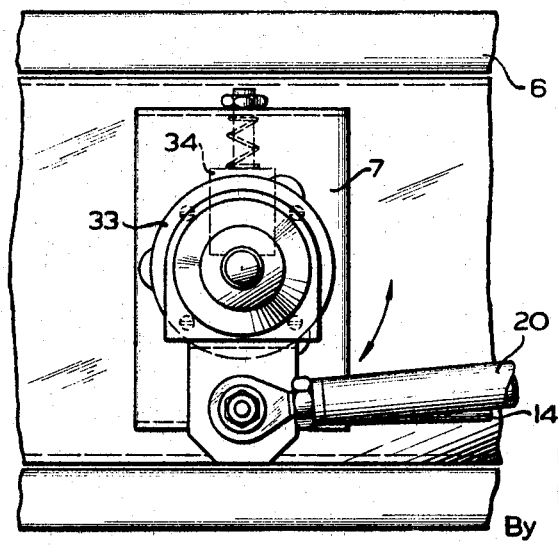
FIG. 5 is a top view of the section in accordance with FIG. 4.
Figure 6:
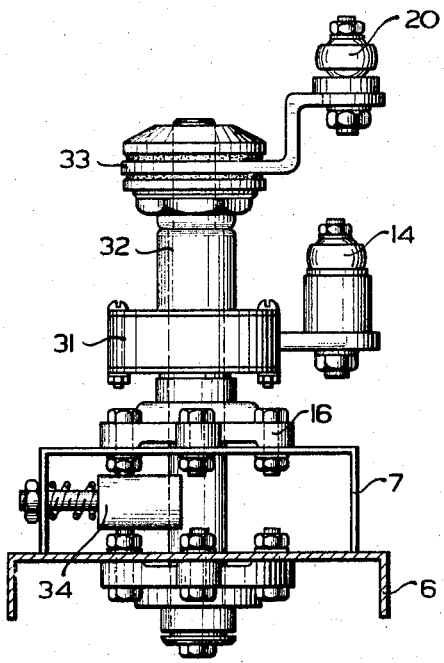
FIG. 6 is a further side elevational view of the same section taken at a 90° angle from the left of FIG. 4.

Also in the modified embodiment in accordance with FIGS. 4 to 6, the pusher bar 14 effects a reciprocating movement which is converted by the roller coupling 31 into a step-wise rotary movement. This step-wise rotary movement is transmitted by a shaft 32 by means of intermediate connections to a friction coupling 33 and is again converted into reciprocating movement by the pusher bar 20.

The friction coupling 33 serves in the event of a stacking or stowing of the carriages to cut out the effect of the conveyor under the influence of the next following carriage to thus avoid any further advancement of the uncoupled carriages in the stack of the carriages.

In order to eliminate a backward movement of the roller coupling 33, a locking arrangement 34 is provided which cooperates with the coupling. Such a backward movement of the roller coupling which can develop when the rollers are uncoupled from their wedges must be avoided so that the pusher bar 20 has imparted to it a constant even movement.

Having now described my invention with reference to the embodiments illustrated in the drawings, I do not wish to be limited thereto, but what I desire to protect by Letters Patent of the United States is set forth in the appended claims.

I claim:

1. Arrangement in conveyor systems for decreasing the advancing speed of carrying cases or boxes having catches, said arrangement comprising carrying support means having guiding rails mounted thereon, advancing means such as a main conveyor means comprising a chain guided by said guiding rails arranged to extend over a stretch in a manufacturing plant and including at least one retarding station for the carrying cases or boxes extending along a section of said stretch and supported by said carrying support means proximate said guiding rails, couplings on said cases or boxes for engagement with said conveyor means, additional or slow advancing means provided at said retarding station operative to move along said carrying cases at reduced speed, in steps, said slow advancing means including a feed bar and rail having pawls for engaging said catches to impart retarded movement to said carrying cases, retarding means including a chain wheel linked to an available source of force such as said conveyor, means operative to convert the rotary motion of said chain wheel into reciprocating motion of said feed bar and rail including a push bar connected to said chain wheel and a push rod operatively linked to said feed bar and rail, a lifting rail intermediate said feed bar and rail presenting an oblique edge operative to disengage said couplings from said conveyor, and spring biased pawls on said feed rail adapted to engage said catches and transfer transportation of said carrier cases to said feed rail.

2. Arrangement in accordance with claim 1, where said retarding means includes a roller coupling associated with a pivotally movable plate on a shaft mounted on a frame on said carrying support, said chain wheel is in engagement with said conveyor, and said push bar is disposed intermediate said chain wheel and said plate.

3. Arrangement in accordance with claim 2, where a latching means is provided for engagement with said shaft to prevent reverse movement of said retarding means.

4. Arrangement in accordance with claim 3, including second push rod, said feed bar and said feed rail movable by said push rod, a friction coupling mounted on said shaft with said roller coupling and said push rod connecting said roller coupling to said feed bar.

5. Arrangement in conveyor system in accordance with claim 1, where said retarding means include a ratchet wheel rotatably supported on a pivotally movable plate mounted on a frame on said carrying support and said push bar is connected to said chain wheel and linked to said ratchet wheel and said push rod links said ratchet wheel and said feed bar.

References Cited

UNITED STATES PATENTS 2,335,579   11/1943   Ransburg _____ 198—76

RICHARD E. AEGERTER, *Primary Examiner.*